United States Patent

Sahm et al.

[11] Patent Number: 5,951,613
[45] Date of Patent: Sep. 14, 1999

[54] APPARATUS AND METHOD FOR DETERMINING THE POSITION OF A WORK IMPLEMENT

[75] Inventors: William C. Sahm; Gregory R. Harrod, both of Peoria; Ronald J. Siroky, Naperville; Craig L. Koehrsen, Peoria; Satish M. Shetty, East Peoria, all of Ill.

[73] Assignee: Caterpillar Inc., Peoria, Ill.

[21] Appl. No.: 08/735,853

[22] Filed: Oct. 23, 1996

[51] Int. Cl.$^6$ .............................. G05B 19/18; G06F 19/00
[52] U.S. Cl. .................................. 701/50; 37/348; 37/382; 37/907; 364/167.02; 364/167.07; 701/300
[58] Field of Search .............................. 701/50, 116, 207, 701/213, 215, 216, 300; 172/2, 4, 4.5; 37/382, 348, 413, 414, 415, 907; 364/167.02, 167.07, 167.08, 167.12

[56] References Cited

U.S. PATENT DOCUMENTS

| | | |
|---|---|---|
| 4,807,131 | 2/1989 | Clegg . |
| 5,612,864 | 3/1997 | Henderson .......................... 364/167.01 |
| 5,764,511 | 6/1998 | Henderson .......................... 364/167.01 |

FOREIGN PATENT DOCUMENTS

WO9701005   1/1997   WIPO ................................ E02F 3/84

*Primary Examiner*—William A. Cuchlinski, Jr.
*Assistant Examiner*—Ed Pipala
*Attorney, Agent, or Firm*—David M. Masterson; Kevin M. Kercher

[57] ABSTRACT

An apparatus for determining a position of a work implement of a work machine in a site coordinate system. The position of the work implement is defined as the position in the site coordinate system of two fixed points located on the work implement. The apparatus includes first and second position sensors mounted on the work implement. A pitch sensor connected to the work implement senses a pitch of the work implement and responsively produces a pitch signal. A cross slope sensor connected to the work implement senses a cross slope of the work implement and responsively produces a cross slope signal. A rotation sensor connected to the work implement senses a rotation of the work implement and responsively produces a rotation sensor. A controller, coupled to the first and second GPS receivers, the pitch sensor, the cross slope sensor and the rotation sensor, receives the first and second position, pitch, cross slope, and rotation signals, determines the position of the work implement in the site coordinate system as a function of the first and second position signals and the pitch signal if the first and second position signals are valid and determines the position of the work implement in the site coordinate system as a function if one of the first and second position signals and the pitch, cross slope and rotation signals if an other of the first and second position signals is not valid.

3 Claims, 7 Drawing Sheets

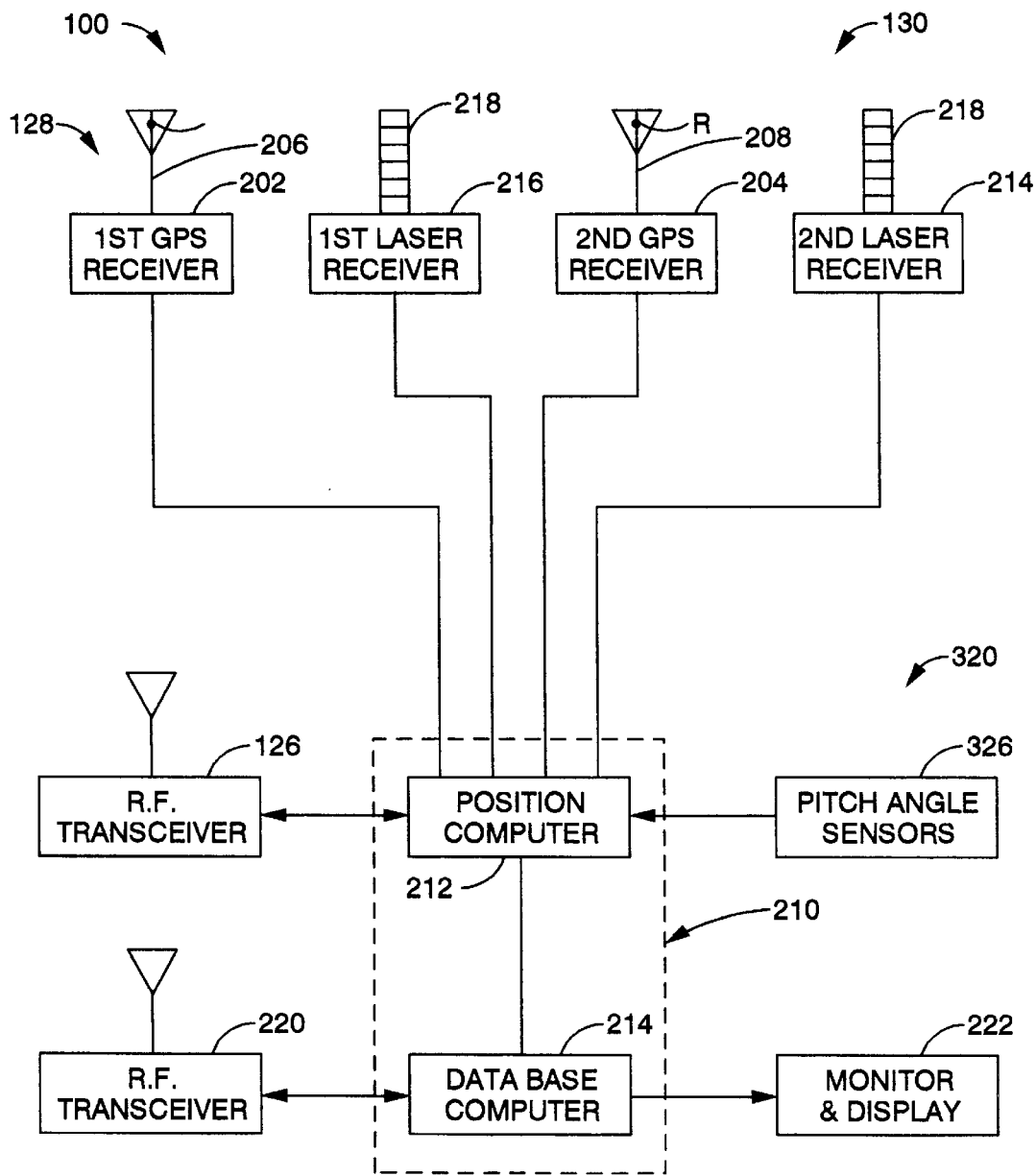
Fig_2_

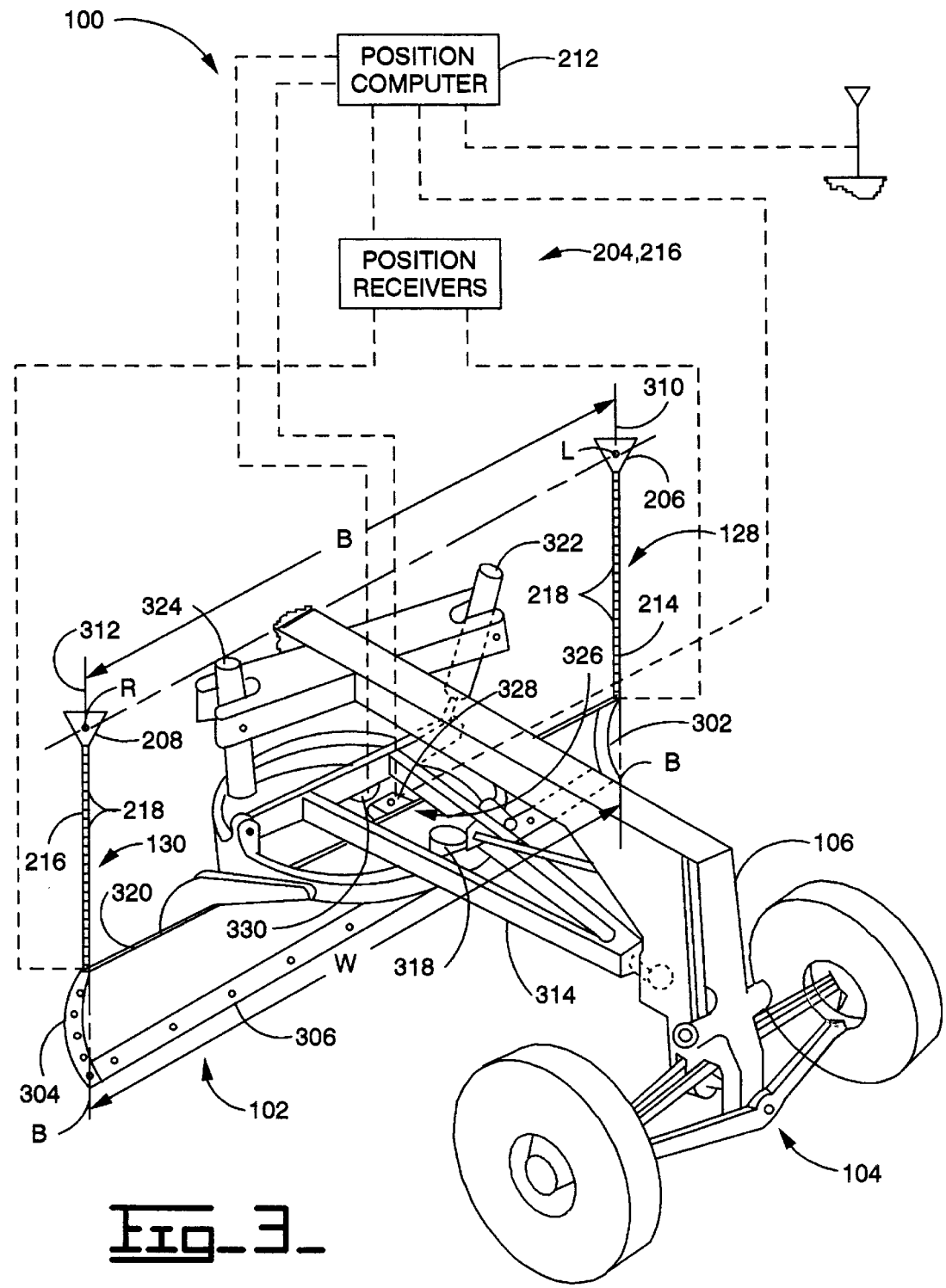
Fig_3_

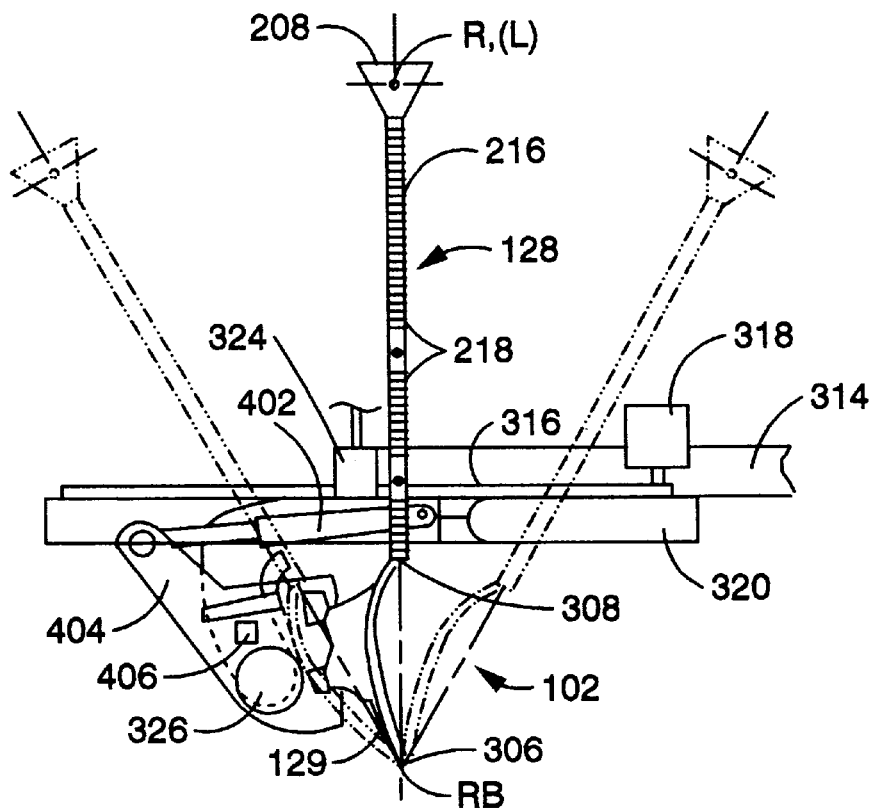
Fig_4_
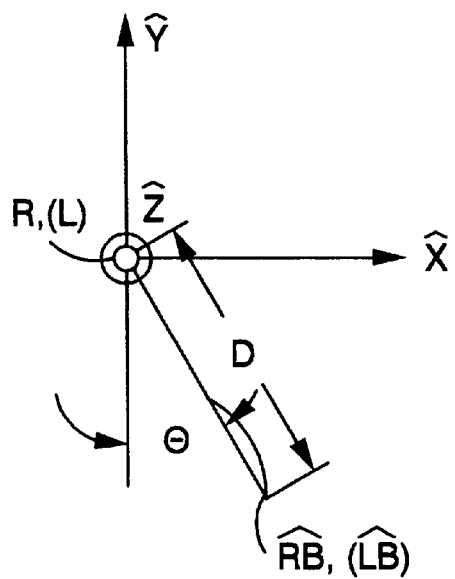
Fig_5_

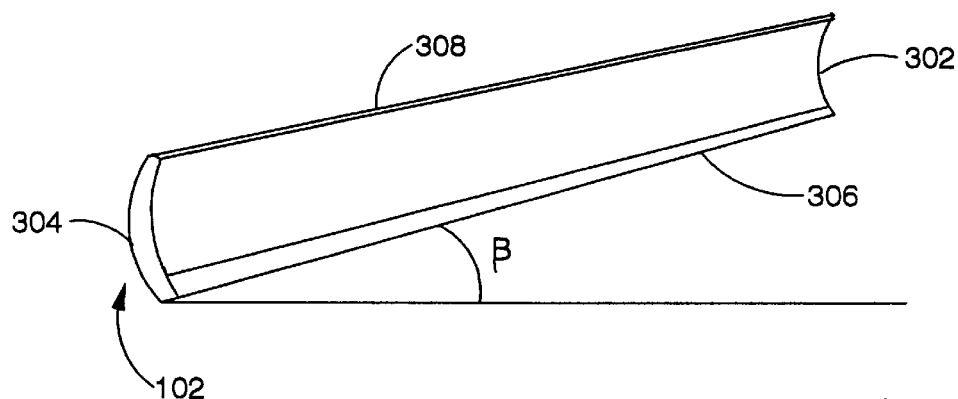
Fig_6_
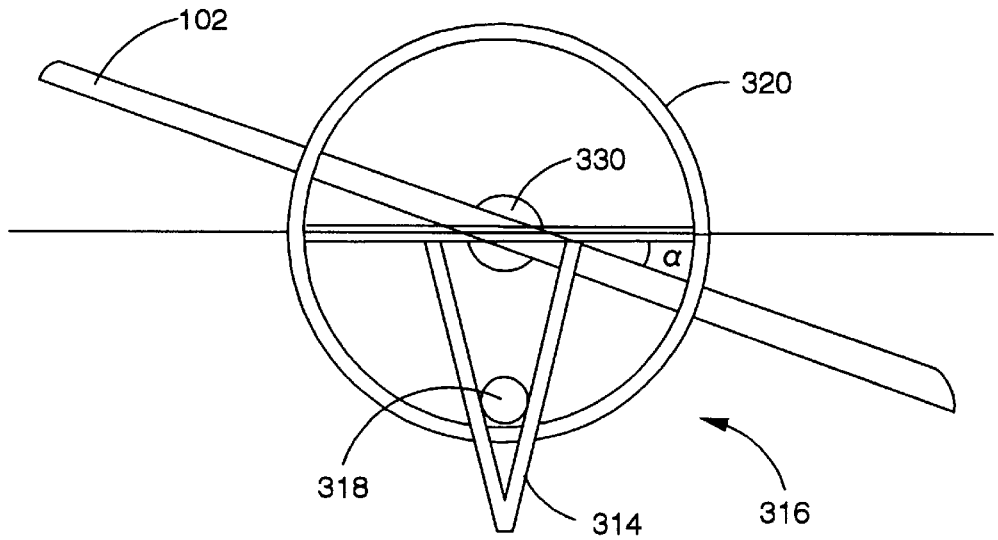
Fig_7_

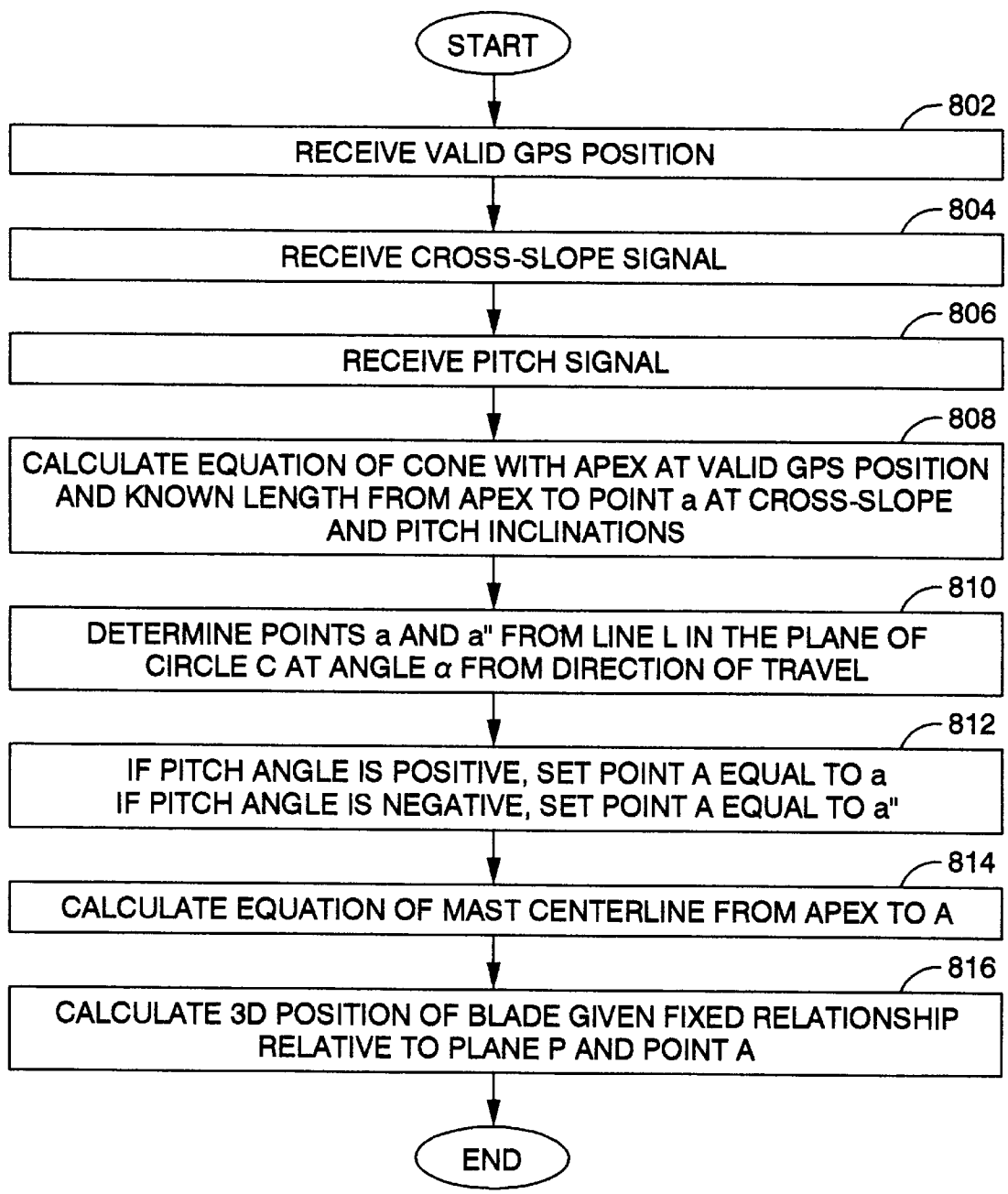
Fig_8_

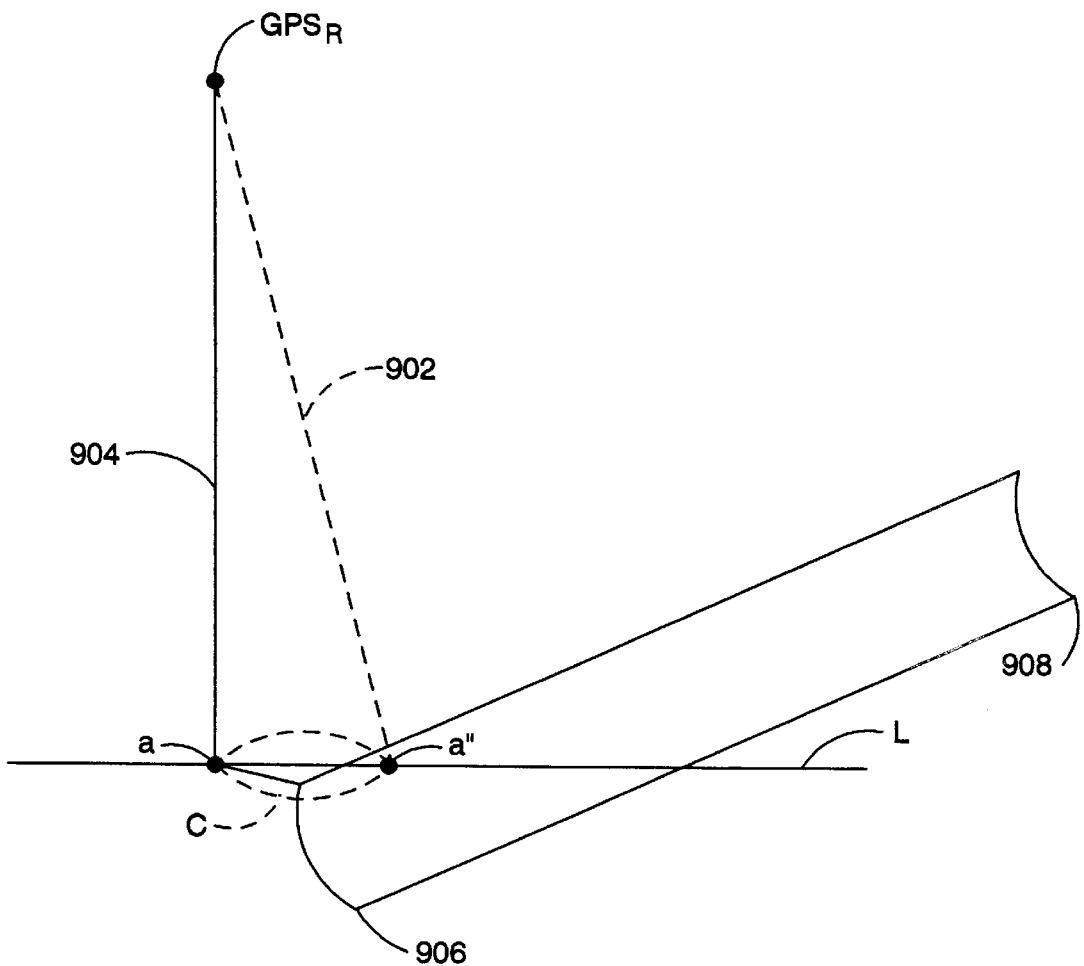
Fig_9_

APPARATUS AND METHOD FOR DETERMINING THE POSITION OF A WORK IMPLEMENT

TECHNICAL FIELD

This invention relates to an apparatus and method for determining the position of a work implement, and more particularly, to a method and apparatus for determining the position of first and second end points of a work implement using a plurality of sensors.

BACKGROUND ART

Machines, for example, motor graders, dozers, compactors, pavers, and profilers to name a just a few, are used for geographic surface altering operations. Such machines typically operate at construction sites which were previously manually surveyed, and staked according to construction site plans. During the process the construction site is frequently checked in order to confirm that the processed site meets the design specifications. This process requires large amounts of manual labor much of which is by highly trained personnel. Further, the machine operator must be highly trained in order to obtain the degree of accuracy required.

Laser systems have been in used in some applications to provide a reference for the operator to follow. A laser beam emitted by a laser positioned at a surveyed location on the site is swept over the site. This establishes a laser plane. A receiver on the machine receives the laser beam and indicates to the operator the elevational position of the beam relative to a location on the machine, such as the machine or implement. This information is used by the machine operator for machine controlling purposes. An example of one such system is shown in U.S. Pat. No. 4,807,131 dated Feb. 21, 1989, to Philip M. Clegg. This patent discloses measuring the elevational position of the grading blade relative to the laser plane and displaying on a monitor parameters such as target elevation, actual elevation, and an allowable range of error so that the operator can, in one mode of operation, adjust the blade position to be within tolerance of the target location.

Implements are normally adjustably connected to the machine frame so that the slope, pitch, and elevation of the work implement can be varied relative to the machine. When the laser receiver is mounted on the machine frame any change in the position of the work implement relative to the frame causes an unaccounted for change in the position of the work implement relative to the plane and the receiver. The information therefore provided to the operator is less than desirable and may not be used to any significant advantage. Placing a single laser receiver on the work implement eliminates this problem to the extent that the laser receiver moves with the work implement and is related to work implement position. However, any changes in tilt, pitch or rotation of the work implement relative to the laser plane are not compensated for and therefore the information provided is still not accurate.

Placing two laser receivers on the implement permits the slope of the blade to be determined relative to the laser plane however this does not allow for the change in position of the implement caused by implement tipping (pitching).

Systems are known which use a constellation of satellites and a special receiver to determine by triangulation the position of a machine (actually the position of the antenna) in three space coordinates relative to a work site coordinate system. Such systems are normally referred to as a kinematic global positioning systems (GPS). Historically, such systems have not been widely accepted since the accuracy of position determination was less than satisfactory for certain applications. Further, slow processing time reduced the commercial feasibility of determining machine position in realtime. Over the past few years the accuracy of position determination has been improved and the speed of processing has been increased. Thus, the potential to determine the realtime position of a machine is now feasible for an assortment of applications including, for example, geographic surface altering machines.

However, one of the problems currently still associated with GPS receivers is the occurrence of periods of time when the GPS data is invalid. There may be several reasons for this occurrence, including obstructions which block the satellite signals or lack of enough satellites in view of the GPS receiver to obtain a good position signal.

The present invention is directed to overcoming one or more of the problems as set forth above.

DISCLOSURE OF THE INVENTION

In one aspect of the present invention, an apparatus for determining a position of a work implement of a work machine in a site coordinate system is provided. The position of the work implement is defined as the position in the site coordinate system of two fixed points located on the work implement. The apparatus includes first and second position sensors mounted on the work implement. The first position sensor determines the position of the first position sensor and producing a first position signal. The second position sensor determines the position of the second position sensor and producing a second position signal. A pitch sensor connected to the work implement senses a pitch of the work implement and responsively produces a pitch signal. A cross slope sensor connected to the work implement senses a cross slope of the work implement and responsively produces a cross slope signal. A rotation sensor connected to the work implement senses a rotation of the work implement and responsively produces a rotation sensor. A controller, coupled to the first and second GPS receivers, the pitch sensor, the cross slope sensor and the rotation sensor, receives the first and second position, pitch, cross slope, and rotation signals, determines the position of the work implement in the site coordinate system as a function of the first and second position signals and the pitch signal if the first and second position signals are valid and determines the position of the work implement in the site coordinate system as a function of one of the first and second position signals and the pitch, cross slope and rotation signals if an other of the first and second position signals is not valid.

In another aspect of the present invention, a method for determining a position of a work implement of a work machine in a site coordinate system. The position of the work implement is defined as the position in the site coordinate system of two fixed points located on the work implement. The method includes the steps of sensing a position of a first point on the work implement using a first position sensor and producing a first position signal and sensing a position of a second point on the work implement using a second position sensor and producing a second position signal. The method further includes the steps of sensing a pitch of the work implement and responsively producing a pitch signal, sensing a cross slope of the work implement and responsively producing a cross slope signal, and sensing a rotation of the work implement and responsively producing a rotation signal. The position of the work implement in the site coordinate system is determined as a function of the first and second position signals and the pitch signal if the first and second position signals are valid. The position of the work implement in the site coordinate system is determined as a function of one of the first and second position signals and the pitch, cross slope and rotation signals if an other of the first and second position signals is not valid.

BRIEF DESCRIPTION OF THE DRAWINGS

FIG. 2 is a diagrammatic block diagram of an apparatus for determining the position of a work implement and a control system for subsequently controlling the position of the work implement;

FIG. 3 is a diagrammatic schematic of the apparatus of FIG. 2 showing the control system in greater detail;

FIG. 4 is a diagrammatic side view of the work implement;

FIG. 5 is a diagrammatic view of the implement shown pitched at an angle Θ in a local coordinate system;

FIG. 6 is a diagrammatic front view of the implement having a cross slope angle, β;

FIG. 7 is a diagrammatic top view of the implement having a rotation angle, α;

FIG. 8 is a flow chart illustrating operation of the present invention; and

FIG. 9 is a diagrammatic illustration of the implement and a position sensor showing calculation of the three-dimensional position of the blade of the work implement.

BEST MODE FOR CARRYING OUT THE INVENTION

Figure 1:
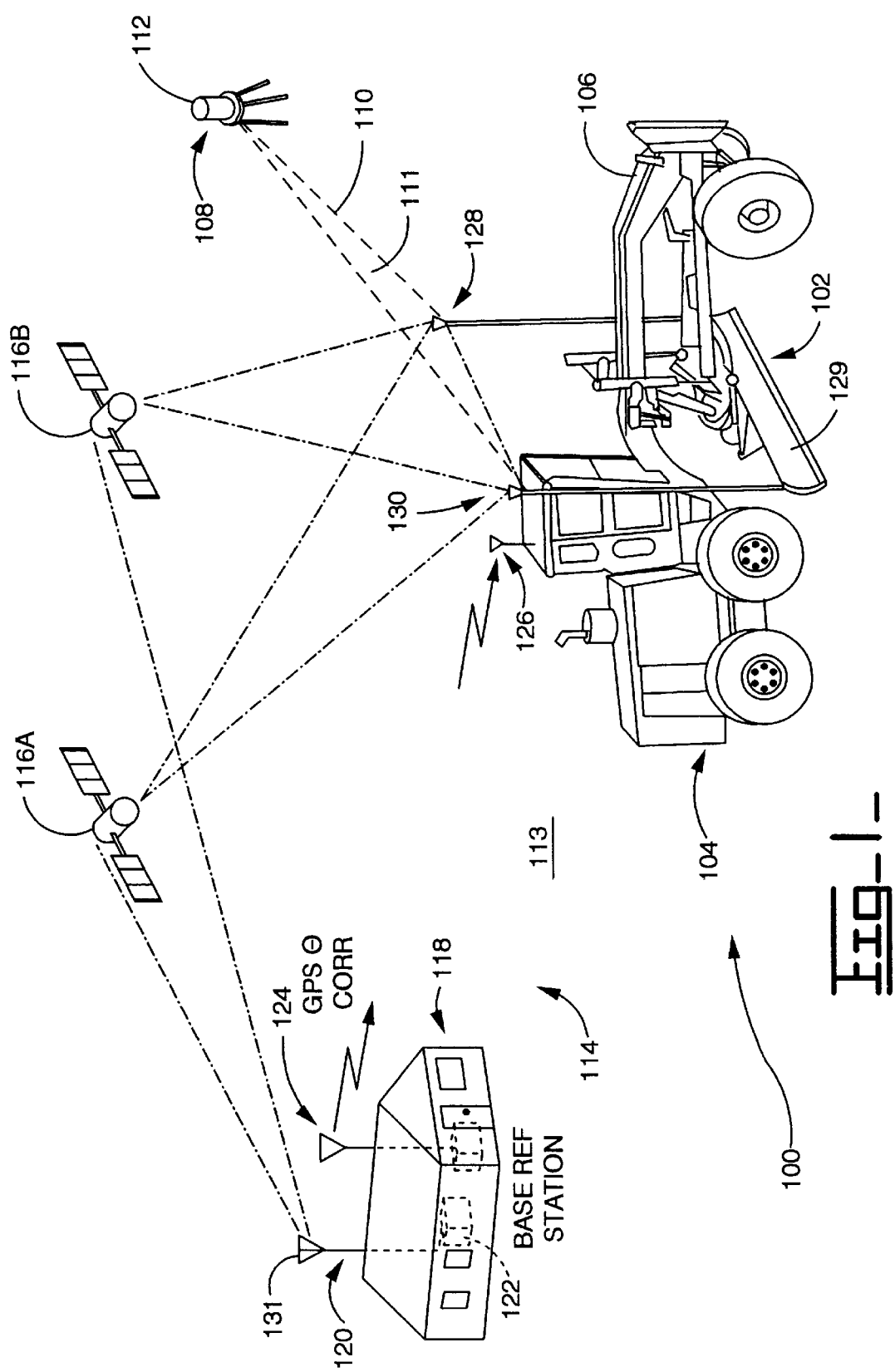
FIG. 1 is a diagrammatic isometric drawing of an embodiment of the present invention showing a system for determining the position of a work implement of a geographic altering.

With reference to the drawings and particularly FIG. 1, an apparatus 100 for determining the position of a work implement 102 of a geographic surface altering machine or work machine 104 is shown. The work implement 102, shown as an earth working blade, is controllably movably mounted on a frame 106 of a geographic surface altering machine 104, shown as a motorgrader. It is to be noted that other machines such as dozers, scrapers, compactors, pavers, profilers and the like, equipped with suitable surfacing altering implements, are equivalents and considered within the scope of the invention.

In the embodiment shown, the apparatus 100 optionally includes a laser scanner 108. The laser scanner 108 is adapted to deliver a low intensity laser beam 110 swept about a substantially vertical axis 112. The laser scanner 108 is positioned at a preselected coordinate location ("x", "y") within a surveyed area hereinafter referred to as a work site 113. The swept laser beam 110 defines a plane 30 at a predetermined elevational position along the vertical axis 112 and establishes an accurate elevational coordinate position "z".

Preferably, the apparatus 100 includes a global positioning system (GPS) 114. The GPS 114 includes a constellation of satellites, two of which are shown at 116A and 116B. Preferably, four or more satellites in "view" of the machine 104 are selected because of favorable geometry for triangulation.

The global positioning system 114 includes a base station 118 and a reference receiving means 120 connected to the base station 118.

The reference receiving means 120 is adapted to receive electromagnetic radiation delivered from a plurality of locations and responsively produce reference positioning signals.

In the preferred embodiment, the reference receiving means 120 includes a GPS reference receiver 122. The base station 118 is located at a known, fixed position, at the work site 113. A transceiver 124 at the base station 118 and a transceiver 126 on the machine 104 provides an RF communication link between the machine 104 and the base station 118 over which reference position data is transferred. A base station processor (not shown) is used in determining the position of the base station relative to the center of the earth.

A first position sensor 128 is mounted on the work implement 102. The first position sensor 128 determines the position of the first position sensor 128 and produces a first position signal.

A second position sensor 130 is mounted on the work implement 102. The second position sensor 130 determines the position of the second position sensor 130 and produces a second position signal.

As best seen in FIGS. 1 and 2, the first position sensor 128 is connected at a first preselected location on the work implement 102 and the second position sensor 130 is connected at a second preselected location on the work implement 102.

In the preferred embodiment, the first position sensor 128 includes a first GPS receiver 202 and the second position sensor 130 includes a second GPS receiver 204. The first and second GPS receivers 202, 204 each have an antenna 206, 208 and a preamplifier (not shown). Position signals received by the first and second antennas 206,208 are amplified and delivered to the first and second receivers 202,204. The first and second receivers 202,204 decode the navigation signals and produce a pseudorange and a satellite position for each selected satellite.

A controller 210 includes a position computer 212. The controller calculates the position of the first and second receivers based on the pseudorange and satellite positions. In particular, the first and second receivers 202,204 determine the position of a receiving point location "L", "R" on the first and second antennas 206,208, respectively. The receiving points "L", "R" are the effective center of receipt of the GPS signals and are used in subsequent calculations. Global position systems such as this are known to those skilled in the art and will therefore not be discussed in any greater detail.

The implement 102 includes an earth grading blade 129. With reference to FIG. 3, the blade 129 has first and second sides 302,304, a cutting edge 306 and an upper edge 308. For reasons of simplicity, the following discussion will be with respect to this particular earthworking blade embodiment. However, it is to be recognized that other implements 102 may replace the blade without departing from the spirit of the invention.

The first antenna 206 is mounted on the blade 129 adjacent the first side 302 and the second antenna 208 is mounted on the blade 129 adjacent the second side 304. The receiving points "L", "R" are spaced a preselected distance "W" apart. As shown, the particular distance "W" is substantially equal in magnitude to a distance between the first and second blade sides 302,304. The first and second receiving points "L", "R" are positioned with respect to first and second point locations "LB", "RB" which preferably lie along the cutting edge 306 of the blade 129. The first and second point locations "LB", "RB" are preferably at first and second corners of the blade 129, at the intersection of the first and second sides and the cutting edge 306, and a distance "B" apart. The distance "B" is preferably equal to distance "W". Placing the first and second antennas 206,208 (receiving points "L", "R") and the first and second points "LB", "RB" at these locations simplifies three dimensional space transformation calculations between the first and second receiving points "L", "R" and the first and second point locations "LB", "RB" of the blade 129.

Preferably, the first and second position sensors 128, 130 are located along first and second axial lines 310,312 extending perpendicular to the cutting edge 306 and parallel to each other. It should be recognized however that other locations may be selected without departing from the spirit of the invention.

Referring to FIGS. 2 and 3, the first and second position sensors 128, 130 optionally include first and second laser receivers 214,216 connected to the blade at the aforementioned first and second predetermined spaced apart locations. Preferably, the first and second laser receivers are at the location of the first and second antennas 206, 208, respectively.

As best seen in FIG. 3, the first and second antennas 206,208 are mounted on one end portion of the first and second laser receivers 214,216, respectively, and the other end portion of the laser receivers 214,216 are connected to the blade 129 at the upper edge 308.

In the preferred embodiment, the laser receivers 214,216 are incremental laser receivers and include a plurality of linearly aligned photo receptors 218 and associated circuitry (not shown) for delivering an output signal representative of the particular receptor illuminated. The construction of laser receivers of this type are well known in the art and will therefore not be discussed in any greater detail.

The first and second laser receivers 214,216 are provided to improve the accuracy of the implement 102 position measurement in the elevational direction and to supplement the measurement obtained from the global positioning system. The first and second laser receivers 214,216 are connected to the position computer 212. The laser receivers deliver output signals to the position computer 212 and the position computer determines the elevational coordinate position "z" of the blade 129 in three dimensional space relative to the particular work site. The first and second lines 310,312 extend along the length of the first and second laser receivers and pass through the receiving points "R" and "L".

Referring to FIG. 1, the reference receiver 122, located at the base station 118, receives signals from the constellation of GPS satellites. The base station computer (not shown) which is connected to the receiver 122 determines the position of the receiver 122 (antenna 131) with respect to the center of the Earth. The reference receiver 122 is used to make a "differential global positioning system". The first and second receivers 202,204 and the reference receiver 122 are commercially available and includes the antenna, preamplifier and receiver.

Referring to FIGS. 3 and 4, the implement 102 is shown in greater detail. The blade 129 is movably connected to the frame 106 by a supporting mechanism 314. The supporting mechanism 314 includes a circle drive mechanism 316 having a selectively actuatable rotary drive motor 318 for rotating a circle 320 and the blade 129 connected thereto about an elevational axis located at the center of the circle 320 in a known manner.

A pair of selectively actuatable fluid operated lift jacks 322,324 are connected to and between the frame 106 and the supporting mechanism 314. The lift jacks 322,324 elevationally move the blade 129 relative to the frame 106. Simultaneous extension of the lift jacks 322,324 lowers the blade 129 and simultaneous retraction of lift jacks 322,324 raises the blade 129. Extension or retraction of either one of the lift jacks 322,324, or extension of one and retraction of the other of the lift jacks 322,324 results in tilting of the blade 129 relative to the frame 106 in directions transverse the direction of movement of the machine 104.

As shown in FIG. 4, a fluid operated tip jack 402 is connected to and between the supporting mechanism 314 and a bellcrank 404. The bellcrank 404 pivotally connects the blade 129 to the circle drive mechanism 316. The tip jack 402 is movable for tipping the bellcrank 404 about the pivotal connection. This results in tipping movement of the blade 129 in forward or rearward directions, as shown in phantom lines in FIG. 4, with the blade oriented transversely of the vehicle frame 106. It should be noted that the terms tip and pitch are used interchangeably and have the same meaning.

As best seen in FIGS. 3, 4 and 5, a pitch sensor 326 is connected to the work implement 102. The pitch sensor senses a pitch ($\Phi$) of the work implement and responsively producing a pitch or pitch angle signal.

As seen in FIG. 5, the blade 129 is shown as being viewed from the second side 304 and looking down along the blade 129.

The controller 210 receives the first and second position signals from the first and second position sensors 128, 130 and determines first and second current coordinate positions "L","R", of the first and second position sensors 128, 130 on a realtime basis, in a site coordinate system related to the work site 113 above. It is to be noted that the first and second signals may include the laser position signals as indicated above when additional accuracy in the elevational direction is required.

The controller 210 preferably disregards the GPS elevational component "z" when a laser position signal is provided.

A cross slope sensor 406 is connected to the work implement 102. A rotation sensor 330 is connected to the work implement 102.

The pitch sensor 326, cross slope sensor 406, and rotation sensor 330 include any appropriate transducer. For example, the pitch sensor 328 includes any capable of sensing the tipped position of the blade.

The transducer 328 is connected to the blade 129 or bellcrank and delivers the pitch angle signal to the position computer 212. The pitch angle signal may be either analog or digital. Should an analog signal be delivered an A/D converter is required to convert the signal for digital processing by the controller 210. The position computer 212 determines a related current position of the first and second point locations on the work implement in a local coordinate system. The local coordinate system is a three dimensional coordinate system established relative to the frame 106 (supporting structure 314).

With reference to FIGS. 4 and 6, the cross slope sensor 406 senses a cross slope or cross slope angle ($\beta$) of the work implement 102 and responsively produces a cross slope signal.

With reference to FIG. 7, which shows a top down diagrammatic view of the work implement 102, the rotation sensor 330 senses a rotation or rotational angle ($\alpha$) of the work implement 102 and responsively produces a rotation sensor.

The controller 210 is coupled to the first and second GPS receivers, the pitch sensor, the cross slope sensor and the rotation sensor.

The controller 210 receives the first and second position, pitch, cross slope, and rotation signals.

The controller 210 determines the position of the work implement 102 in the site coordinate system as a function of the first and second position signals and the pitch signal if the first and second position signals are valid.

The controller 210 determines the position of the work implement 102 in the site coordinate system as a function of one of the first and second position signals and the pitch, cross slope and rotation signals if an other of the first and second position signals is not valid.

Under normal operating conditions, i.e., valid positions signals are received from the first and second position sensors 128, 130, then the position of the work implement 102 is determined as a function of the first and second position signals and the pitch signal.

Determining the position of the work implement 102 as a function of the first and second position signals and the pitch signal straightforward and based on the geometry of the work linkage.

If on the other hand, the position signal from one of the first or second position sensors 128, 130 is not valid, then the position of the work implement 102 is determined as a function of the other position signal, the pitch signal, the cross-slope signal, and the rotation signal.

With reference to FIGS. 8 and 9, the method for determining the position of the blade 320 using one of the first and second position sensors 128, 130, and the pitch, cross-slope and rotation sensors will now be discussed. For purposes of discussion only, it is assumed that the position data from the first position sensor 128 is invalid and that the position data from the second position sensor 130 is valid.

In a first control block 802, the position signal from the second position sensor 130 is received. With reference to FIG. 9, the position signal corresponds to point $GPS_R$.

In a second control block 804, the cross slope signal from the cross slope sensor 406 is received. In a third control block 806, the pitch signal from the pitch sensor 326 is received.

In a fourth control block 808, the equation of a cone 902 having an apex at point $GPS_R$. The length of the sides of the cone are equal to the length of the mast (shown as line segment 904). The cone 902 includes a circle C.

In a fifth control block 810, points "a" and "a'" in site coordinates are determined. Point a is located on the circle C and is defined by the known length of the mast and the pitch and cross slope signals. Points a and a" are located on a line L. Line L is defined by the angle of rotation and the direction of travel of the machine.

Points a and a" represent the two possible locations of the end point of the mast. In a sixth control block 812, if the pitch angle is negative, then the location of the end point of the mast is point a. If the pitch angle is positive, then the location of the end point of the mast is point a". Point A represents the location of the end point of the mast in site coordinates and is equal to either point a or point a".

In a seventh control block 714, the eqn. Of the mast centerline (line segment 904) is calculated.

In an eighth control block 716, the three dimensional position of the blade is determined. In the preferred embodiment, the three dimensional position of the blade is defined by the blade tips (points 906 and 908). The position of the blade tips can be determined using points $GPS_R$ and A and the geometry of the work linkage. In the preferred embodiment, the work linkage is constructed such that the left and right masts are in the same plane (P) and there is a predetermined geometric relationship between plane P and the blade tips.

Returning to FIG. 2, the controller 210 includes a database computer 214, of any suitable type, for example a personal computer having a microprocessor, and adequate memory is connected to the position computer 212. The database computer 214 receives signals from the position computer 212 and updates in real time the current coordinate position of the first and second point locations RB, LB on the blade 129 within the work site 113 as the machine 104 traverses the work site 113. The database computer 214 is also connected to a transceiver 220. The transceiver 220 is mounted on the machine 104 and in radio frequency transmission communication with the transceiver 124 at the base station 118. The transceiver 124 is connected to a landbased computer (not shown) located at the base station 118. The transceiver 124 communicates with the transceiver 220 and transfers data between the database computer 214 and the landbased computer. Data such as machine position, implement position, changes to the earth's topography and the like are transmitted therebetween. For example, changes made to the earth by the implement 102 during operation of the machine 104 are updated in real time in the position computer 212 located on the machine 104, based on the tracking of the first and second points RB, LB in the site coordinate system. Information such as this is transmitted to update the landbased computer to update the site map retained therein.

A monitor 222 of any suitable commercially available construction for example, a liquid crystal display, a cathode ray tube, or other suitable device capable of displaying information, is connected to the database computer 214. The database computer 214 delivers signals to the monitor 222 which displays pictorially or graphically the current position of the blade relative to the work site 113. The display is preferably a two dimension elevational cross-section of the work site showing the blade in transverse elevation as seen in FIG. 4. However, a three dimensional representation of the blade 129 in three dimensional space is within the scope of the invention.

Digitized plans or models of the actual work site 113, as previously determined by a topographic survey, may be loaded into the database computer 214. A digitized plan or model of the desired work site, as drafted by an architect, may also be loaded into the database computer 214. The actual work site data is updated in real time based on the position of the first and second point locations RB, LB, as determined above. The database being dynamic facilitates real-time tracking of the first and second point locations RB, LB and the area of the earth's surface being altered by the blade 320 as the blade traverses the work site 113. A responsive signal is delivered from the database computer 214 to the monitor 222 and the current position of the blade 320, the actual work site, as altered, and the desired work site elevation is displayed on the monitor 222.

Industrial Applicability

With reference to the drawings and in operation, the present invention provides a method and system for determining the position of a blade 320 of a work machine in a site coordinate system.

In the preferred embodiment, the three dimensional position of the blade is defined as the location of the blade tips in the site coordinate system.

First and second position sensor 128,130 are mounted on masts connected to the blade 320. Preferably, the first and second position sensors 128, 130 include GPS receivers for determining the position of points preferably located at the respective GPS antennas. Optionally, the first and second position sensors 128, 130 include laser plane receivers to enhance position estimates. A pitch sensor 326 is used to sense the pitch of the blade 320.

Under normal conditions, the GPS receivers are capable of determining position estimates. Under these conditions, the present invention determines the blade position as a function of the position signals from the first and second position sensors 128, 130 and the pitch signal.

The present invention further includes a cross slope sensor 406 and a rotation sensor 330. Under certain conditions one of the GPS receivers may be incapable of delivering a valid position signal. If for any reason one of the cannot deliver a valid position signal, the present invention calculates the blade position as a function of the position signal from the other position sensor and the pitch, cross slope and rotation signals.

Other aspects, objects, advantages and uses of the present invention can be obtained from a study of the drawings, disclosure and appended claims.

We claim:

1. An apparatus for determining a position of a work implement of a work machine in a site coordinate system, wherein the position of the work implement defined as the position in the site coordinate system of two fixed points located on the work implement, comprising:

a first position sensor mounted on the work implement for determining the position of the first position sensor and producing a first position signal;

a second position sensor mounted on the work implement for determining the position of the second position sensor and producing a second position signal;

a pitch sensor connected to the work implement for sensing a pitch of the work implement and responsively producing a pitch signal;

a cross slope sensor connected to the work implement for sensing a cross slope of the work implement and responsively producing a cross slope signal;

a rotation sensor connected to the work implement for sensing a rotation of the work implement and responsively producing a rotation sensor; and a controller, coupled to the first and second position sensors, the pitch sensor, the cross slope sensor and the rotation sensor, for receiving the first and second position, pitch, cross slope, and rotation signals, determining the position of the work implement in the site coordinate system as a function of either the first and second position signals and the pitch signal if the first and second position signals are valid, or by determining the position of the work implement in the site coordinate system as a function of one of the first and second position signals and the pitch, cross slope and rotation signals if one of the first and second position signals is not valid.

2. A method for determining a position of a work implement of a work machine in a site coordinate system, wherein the position of the work implement defined as the position in the site coordinate system of two fixed points located on the work implement, comprising:

sensing a position of a first point on the work implement using a first position sensor and producing a first position signal;

sensing a position of a second point on the work implement using a second position sensor and producing a second position signal;

sensing a pitch of the work implement and responsively producing a pitch signal;

sensing a cross slope of the work implement and responsively producing a cross slope signal;

sensing a rotation of the work implement and responsively producing a rotation sensor; and receiving the first and second position, pitch, cross slope, and rotation signals, then either determining the position of the work implement in the site coordinate system as a function of the first and second position signals and the pitch signal if the first and second position signals are valid, or determining the position of the work implement in the site coordinate system as a function of one of the first and second position signals and the pitch, cross slope and rotation signals if one of the first and second position signals is not valid.

3. A method, as set forth in claim 2, wherein the step of determining the position of the work implement in site coordinates as a function of one of the first and second position signals and the pitch, cross slope and rotation signals includes the steps of:

calculating an equation of a cone having an apex at one of the first and second points corresponding to the one of the first and second position signals which is valid as a function of the one of the first and second position signals and the pitch and cross slope signals;

determining a point a and a point a", located on a circle defined by the cone, as function of the rotation signal and a direction of travel; and, determining a point A as one of point a and point a" as a function of the pitch angle.

* * * * *

UNITED STATES PATENT AND TRADEMARK OFFICE
CERTIFICATE OF CORRECTION

PATENT NO : 5,951,613
DATED : Sept. 14, 1999
INVENTOR(S): Sahm et al.

It is certified that error appears in the above-identified patent and that said Letters Patent is hereby corrected as shown below:

Please amend Patent No. 5,951,613 at Column 1, line 4 by adding the following new paragraph:

--The invention described herein was made in the performance of work under NASA Cooperative Agreement No. NCC2-9007, Contract No. TRP SOL93-29 and is subject to the provisions of Section 305 of the National Aeronautics and Space Act of 1958 (42 U.S.C. 2457). The Government has certain rights to this invention.--

Signed and Sealed this

Twenty-fourth Day of October, 2000

*Attest:*

Q. TODD DICKINSON

*Attesting Officer*     *Director of Patents and Trademarks*